United States Patent Office 3,351,841
Patented Nov. 7, 1967

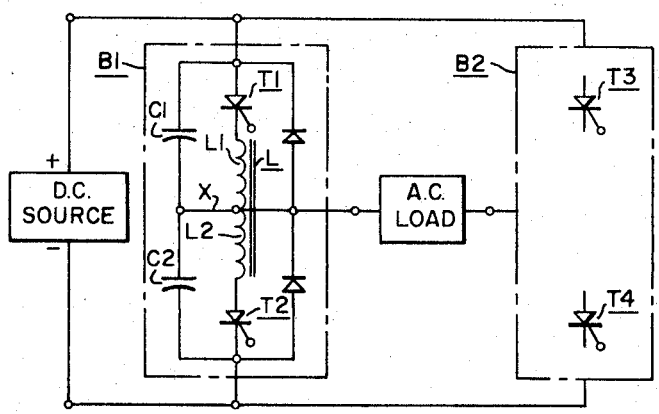
FIG. 1.
PRIOR ART
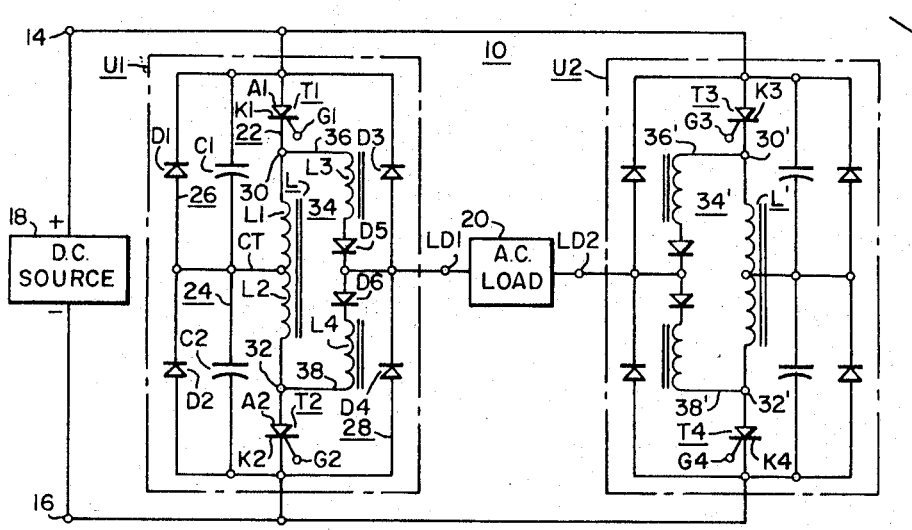
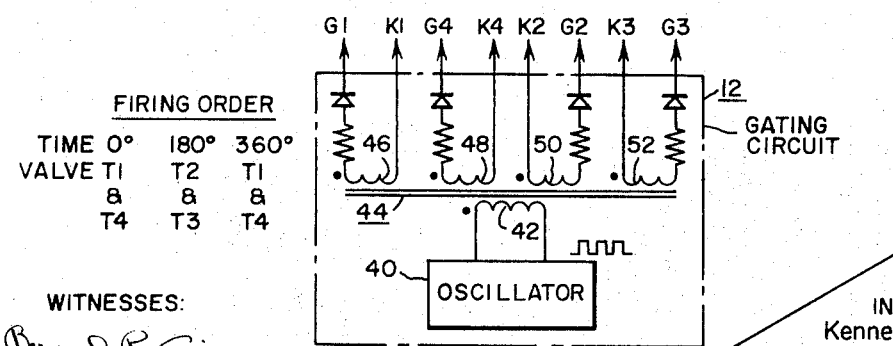
FIG. 2.
FIRING ORDER
| TIME | 0° | 180° | 360° |
|---|---|---|---|
| VALVE | T1 & T4 | T2 & T3 | T1 & T4 |
WITNESSES:
Bernard R. Gieger
James F. Young
INVENTORS
Kenneth Lipman &
Eugene R. Pledger.
BY
Clement J. Pognokas
ATTORNEY

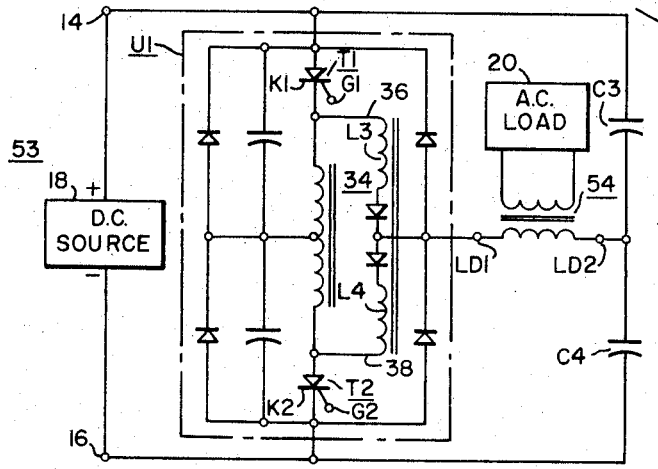
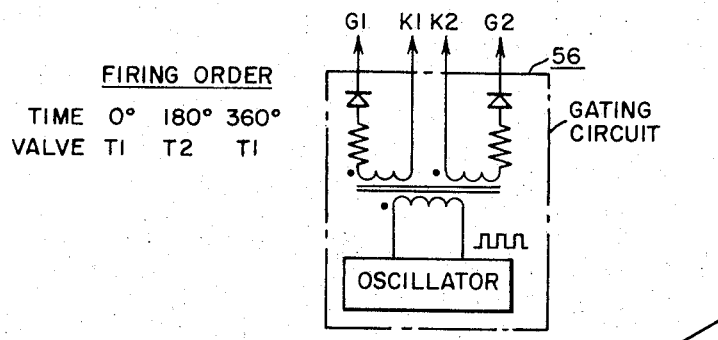
FIG. 3.
FIRING ORDER
| TIME | 0° | 180° | 360° |
|---|---|---|---|
| VALVE | T1 | T2 | T1 |
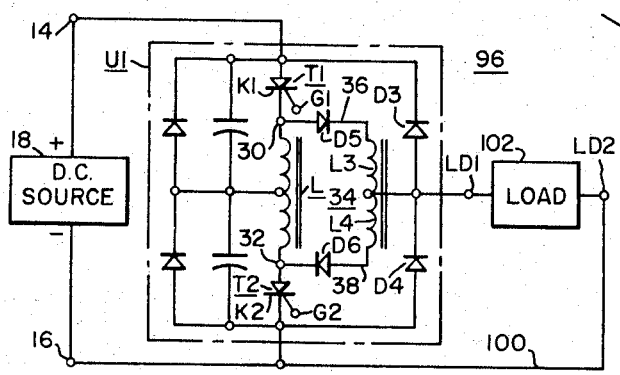
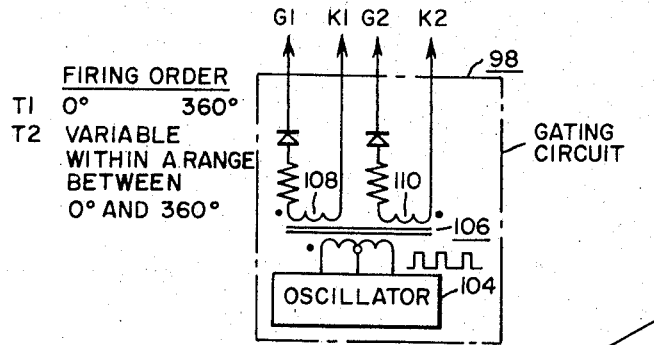
FIG. 5.
FIRING ORDER
T1  0°       360°
T2  VARIABLE
    WITHIN A RANGE
    BETWEEN
    0° AND 360°

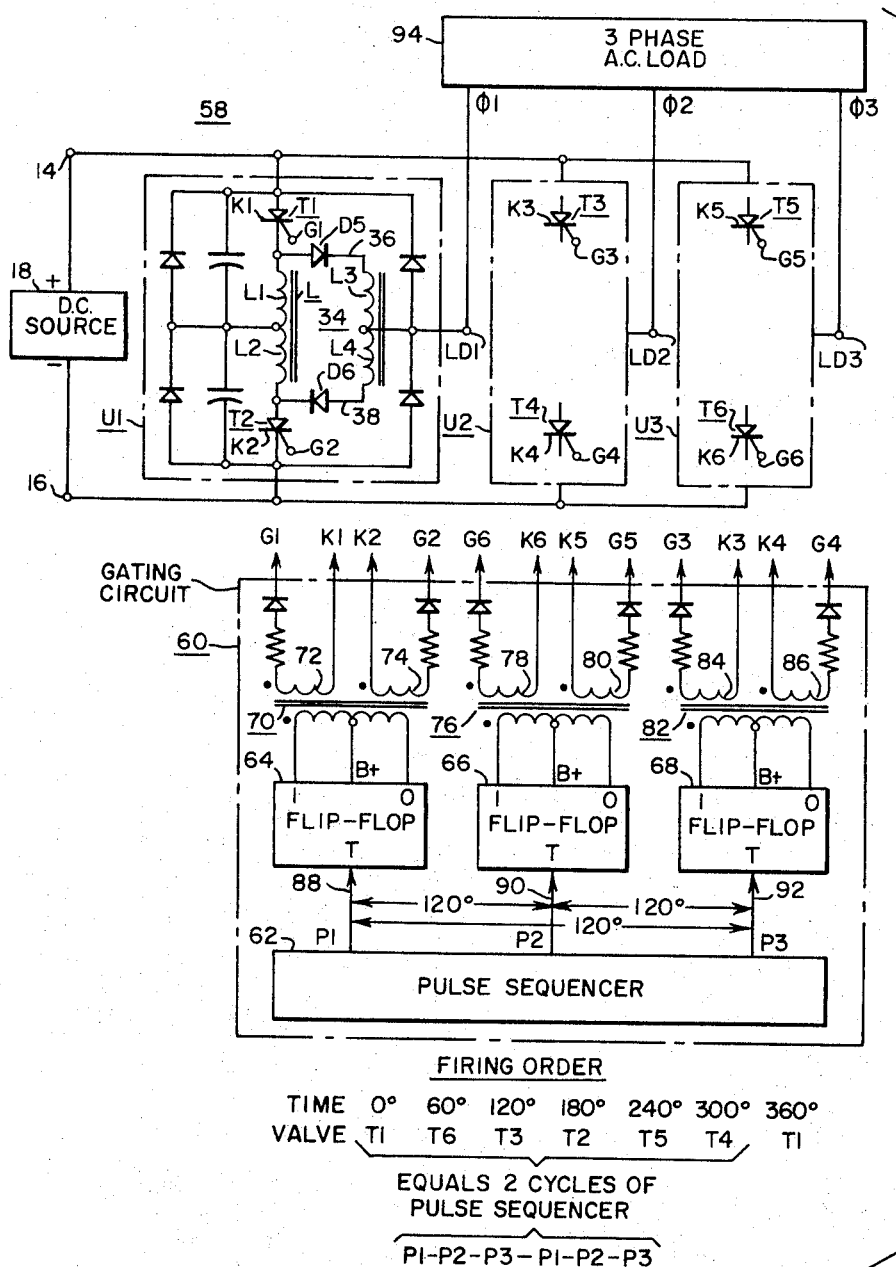

3,351,841
CURRENT CONVERTER WITH DECOUPLING NETWORK FOR ISOLATING LOAD FROM COMMUTATION CIRCUIT ELEMENTS
Kenneth Lipman, Tonawanda, and Eugene R. Pledger, West Seneca, N.Y., assignors to Westinghouse Electric Corporation, Pittsburgh, Pa., a corporation of Pennsylvania
Filed July 16, 1965, Ser. No. 472,622
6 Claims. (Cl. 321—45)

This invention relates to current converting apparatus such as DC (direct current) choppers and DC to AC (alternating current) inverters and more particularly to such apparatus having at least one valve pair employing complementary impulse type commutation.

The prior art bridge type series inverter employing a conventional, split capacitor, split reactor, complementary impulse type forced turn-off commutation scheme is subject to a number of disadvantages and design difficulties. In this prior art circuit (FIG. 1), the center tap of the split commutation reactor is connected to the load, whereby the reactor carries both commutation energy and the load current. Various types of transient and steady state loads can cause available commutation voltage to drop, requiring derating, depending on the conditions of the load. A design drawback is the fact that a commutating reactor close to the ideal which would permit full utilization of the tubes or valves employed, cannot be built to operate in the prior art bridge type inverter with a split capacitor, split reactor, forced commutation scheme. The reactor must be physically small to provide tight coupling between the windings. However, working against this is the high copper winding area required in order to carry the load current. A gap is undesirable because it decreases the magnetic permeability. However, a gap is required to prevent saturation due to load current. Load current flowing through the commutation reactor prior to switching constitutes stored energy in the reactor which is not completely transferred during switching thus reducing the back voltage or reverse bias on the valve being turned-off and decreasing the available turn-off time.

The above discussed disadvantages are minimized in accordance with the present invention by employing a load decoupling network which prevents the drain of stored commutation voltage into the load circuit and steers the load current away from the commutating reactor so that the commutating reactor can be designed to optimum parameters for commutation.

It is therefore an object of the present invention to provide a novel current converting system employing a split capacitor, split reactor, complementary, impulse type commutation scheme wherein the reactor may be designed close to the ideal parameters for its role in the commutating function.

Another object of the invention is to provide a novel current converter employing a split capacitor, split reactor, impulse type commutation scheme having a novel decoupling network for keeping the load current path separate from the commutation reactor.

Another object is to prevent stored commutation voltage from being drained off by the load circuit.

A further object of the invention is to provide a novel current converter employing a complementary impulse type commutation scheme wherein the load circuit is decoupled from the commutation circuit.

Other and further objects and advantages of the present invention will become apparent from the following detailed description taken in connection with the drawings wherein FIGS. 2, 3 and 4 illustrate preferred embodiments of the invention.

In the drawings:
FIGURE 1 is a diagram of a prior art DC to AC inverter;
FIGS. 2, 3 and 4, are diagrams of DC to AC inverters embodying the present invention; and
FIG. 5 is a diagram of a DC chopper embodying the invention.

The prior art inverter shown in FIG. 1 is a bridge type employing a split capacitor, split reactor, complementary impulse type commutation scheme. Complementary impulse type commutation is an arrangement whereby the turn-on of one of the power valves results in the generation of an impulse of sufficient duration (turn-off time) across another of the power valves in a reverse bias direction, thus to turn-off the other valve.

In FIG. 1, current converting units B1 and B2 are alike. Valve T1 is turned-off in response to the turn-on of valve T2 and vice versa. Likewise valve T3 is turned-off in response to the turn-on of valve T4 and vice versa. The basic firing order is: at 0°-valves T1 and T4; at 180°-valves T2 and T3; at 360°-valves T1 and T4; and so on.

While the mode of operation of the split capacitor, split reactor commutation scheme in FIG. 1 is well known, certain disadvantages thereof mentioned in the prefatory remarks herein may be more obvious from a brief description of operation of the commutating scheme. Using the left side (unit B1) as an example: complementary gating signals are supplied to valves T1 and T2 so that one is gated on while the gate signal is removed from the other. When valve T1 is blocking voltage, valve T2 is conducting, capacitor C1 is charging toward the supply voltage value, capacitor C2 is discharged, and load current is flowing through the bottom half L2 of the split reactor L. When valve T1 is gated on, the gate signal is removed from valve T2. Valve T1 no longer blocks voltage, and the capacitor C1 voltage appears across the upper reactor portion L1. Since reactor portion L2 is inductively coupled to reactor portion L1, the voltage across portion L1 appears across portion L2 by transformer action. However, because of the capacitors C1 and C2, the center tap X cannot change voltage instantly, and since the point X is at negative polarity it forces the anode of valve T2 negative thus reverse biasing valve T2 and turning it off.

The turn-off action may also be explained as follows. The capacitor C1 voltage appears across the reactor L1 and through transformer action across reactor L2. The voltage induced in L2 is applied through the capacitor C2 across the valve T2 in a reverse bias direction since the voltage induced in the reactor L2 is negative at the lower end of the reactor. The reverse bias applied to valve T2 turns it off.

With valve T1 turned-on, C1 is discharged through valve T1, and valve T2 being open-circuited across capacitor C2, this capacitor begins to charge toward the supply voltage value. The load current is now supplied through valves T1 and T4 passing through the reactor portion L1.

When valve T2 is subsequently gated on in its regular firing order, the charge on capacitor C2 through the unblocked valve T2 appears across the reactor portion L2, and by transformer action across reactor portion L1, thereby forcing the cathode of valve T1 positive to turn-off valve T1. When valve T1 is turned-off, capacitor C1 is unshunted and begins to charge toward the supply voltage. Capacitor C2 discharges through valve T2 and valves T2 and T3 now supply the load current. The above operational sequences repeat themselves as the valve pairs T1–T4 and T2–T3 are alternately gated on.

From the above operational description of the prior art circuit of FIG. 1, at least two disadvantages become obvious. One is that the load current and the commutation system share the same reactor L1 and L2, and therefore the reactor becomes an undesirable compromise. Another is that the condenser charge required for commutation may be lost into the load circuit in case of sudden load transients occurring just before commutation time. For example if valve T1 is on, a sudden load transient can cause a potential drop at the center tap X, and thereby at least partially discharge condenser C2, thus losing commutation energy for the next switching of the valves. These disadvantages are substantially eliminated or minimized by the load decoupling network of the present invention as hereinafter explained.

In FIG. 2 there is shown a current converter in the form of a single phase bridge type DC to AC inverter. The inverter bridge is shown at 10, while the firing or gating circuit for its valves is indicated at 12, it being understood that the two are interconnected by connecting each output line of the gating circuit to a correspondingly referenced circuit point in the bridge circuit.

The bridge 10 employs four controlled electric valves T1, T2, T3 and T4, each provided with power current inlet and power current outlet electrodes A and K, respectively, a control electrode G, and an internal main current path extending from the current inlet electrode A to the current outlet electrode K. The reference characters for each valve T and its associated electrodes A, K and G have the same numerical suffix. Thus, the power inlet electrode of valve T2 is labeled A2, etc.

Each of the valve T is of the type that normally blocks current flow in both the forward and reverse directions. However, in response to the application of a control signal of appropriate magnitude and polarity to the control electrode of the valve, while the valve is voltage biased in a particular direction, the valve is rendered highly conductive (fired) in the latter direction, generally referred to as the forward direction. Conduction continues, even after removal of the control (firing) signal, until the power current thruogh the valve falls below a predetermined minimum holding value. Turn-off of the valve is forced by applying a sufficient reverse voltage across the valve. Suitable examples of this type of valve are thyratrons and solid state controlled valves for instance thyristors as indicated in the drawings. As is well known thyristors are thyratronic (thyratron-like) solid state controlled valves. A popular form of thyristor is known as the silicon controlled rectifier. The respective inlet, outlet and control electrodes of a thyristor are usually referred to as the anode, cathode and gate electrodes respectively. In thyristors, the control circuit usually includes the gate and cathode electrodes, and the power or main current path extends internally from the anode to the cathode.

With specific regard to silicon controlled rectifiers, forward voltage is applied to them when the anode is made positive relative to the cathode. With the appropriate positive voltage on the anode, that is with the main current path of the valve forward biased, the controlled valve T will be fired (rendered conductive) when the gate electrode has applied thereto a voltage of appropriate polarity and magnitude to forward bias the gate junction. In the specific example disclosed, the valves T will be turned-on (fired) when a positive signal is applied to the gate electrode G relative to the cathode K while the valve is forward biased, that is, with positive voltage on the anode A relative to the cathode K.

Bridge 10 is provided with DC input terminals 14 and 16 for connection to a suitable source of DC 18. The bridge also includes output or load terminals LD1 and LD2 for supplying a load 20. Connected across the DC terminals 14 and 16 are two current control units U1 and U2. These units are identical and corresponding components, except the power valves, bear the same reference characters, with those in unit U2 being "primed."

Since current control unit U1 and U2 are identical, a detailed description of unit U1 will suffice. Unit U1 is provided with circuits 22, 24, 26 and 28, each connected across the DC terminals 14 and 16. Circuit 22 includes in series and in the order named, valve T1, a junction 30, the upper half L1 of a center-tapped reactor L, the center tap CT of the reactor, the lower half L2 of the reactor, a junction 32 and valve T2. Circuit 24 includes in series and in the order named a commutation capacitor C1, the junction CT and a commutation capacitor C2. The circuit 26 includes in series and in the order named, an asymmetric device D1, the junction CT, and an asymmetric device D2. Circuit 28 includes in series and in the order named, an asymmetric device D3, load terminal LD1 and an asymmetric device D4.

A load decoupling network 34, formed by two unidirectional circuits 36 and 38, is connected between the load terminal LD1 and junctions 30 and 32. Asymmetric circuit 36 is connected between junction 30 and output terminal LD1, and includes in series an asymmetric device D5 and an impedance for example the reactor L3. In like manner, asymmetric circuit 38 is connected between junction 32 and load terminal LD1, and includes an asymmetric device D6 in series with an impedance for example the reactor shown at L4. Each of the asymmetric devices D (D1, D2, D3, D4, D5 and D6) may for example be a solid state diode or half-wave rectifier.

Valves T1 and T2 are poled in the same direction relative to the DC input terminals 14 and 16. While diodes D1 and D2 are poled alike, they are poled in the opposite direction relative to valves T1 and T2. Diodes D3 and D4 are poled in the same direction as diodes D1 and D2 relative to the DC input terminals 14 and 16. Diodes D5 and D6 are oppositely poled relative to the load terminal LD1.

The firing circuit 12 is arranged to sequentially fire (gate) the valve pairs T1–T4 and T2–T3, periodically alternating from one valve pair to the other. Thus valve T1 and T4 located in a first pair of opposite branches of the bridge are fired together during one interval, and valves T2 and T3 located in a second pair of opposite branches of the bridge are fired together during the succeeding interval, and so on.

Firing circuit 12 is shown as having four isolated outputs connected to the control circuits of the respective valves. The firing circuit 12 includes a suitable oscillator 40, for example a square-wave oscillator, whose output is coupled to the primary winding 42 of a pulsing transformer 44. This transformer 44 is provided with four secondary windings 46, 48, 50 and 52, each connected through a series diode and resistor network to the control input circuit of a different one of the controlled valves T. More specifically, as indicated in the drawings, winding 46 is connected to the gate circuit of valve T1; winding 48 is connected to the gate circuit of valve T4; winding 50 is connected to the gate circuit of valve T2; and winding 52 is connected to the gate circuit of valve T3. The order in which firing pulses are applied to the respective valve pairs is indicated in the firing order table in FIG. 2. During one-half cycle of its oscillation, the firing circuit 12 will apply gating pulses to valves T1 and T4, rendering these valves conductive, and on the other half cycle, gating pulses will be applied to valves T2 and T3 to render these valves conductive.

It should be understood that other suitable firing circuits may be employed. Known techniques may be employed to vary the output, for example by making corresponding phase changes between signals applied to valves T1 and T3 and between signals applied to valves T2 and T4, to provide what is known as pulse width modulation.

The inverter bridge of FIG. 2 may be looked at as two alternately conductive main current paths that couple the DC source 18 to the load 20 and perform the function of a periodic reversing switch to provide AC to the load. In the example, one path is from input terminal 14 through valve T1, junction 30, asymmetric circuit 36, load terminal LD1, load 20, load terminal LD2, asymmetric circuit 38', junction 32', valve T4, and back to the DC source through DC input terminal 16. The other alternately switched path leads from DC input terminal 14 through valve T3, junction 30', asymmetric circuit 36', output terminal LD2, load 20, output terminal LD1, asymmetric circuit 38, junction 32, valve T2, and back to the DC power supply through DC input terminal 16. It should be apparent from the above, that the bridge branch formed by valve T4 and asymmetric circuit 38' provides a return path for the opposite bridge branch including valve T1 and asymmetric circuit 36 in supplying current to the load 20. Likewise the branch formed by valve T2 and asymmetric circuit 38 provides a return path for the opposite branch including valve T3 and asymmetric circuit 36' in supplying the load 20. From the above description of the alternately switched current paths through the inverter, it should now be apparent that the decoupling networks 34 and 34' provide a load current path which effectively by-passes the commutating reactors L and L'.

The commutation capacitors C1 and C2 and the commutation reactor L in FIG. 2 perform the commutating or valve turn-off function in the same manner as described for the circuit in FIG. 1, with the important difference that the commutating network (capacitors C1, C2 and reactor L) in FIG. 2 are decoupled from the load by the decoupling network 34. Since the commutating reactor L in FIG. 2 does not have to carry the load current, it can be designed to optimum parameters for the commutation function. Thus the commutation reactor L may be made small in size and with little or no air gap. Also by isolating the load circuit from the commutation circuit, the decoupling diodes D5 and D6 prevent excessive load conditions from discharging the commutation capacitors, especially just before commutation, which if allowed to occur would at least undesirably decrease turn-off time, and at worst would prevent turn-off.

The manner in which the decoupling network 34 prevents the loss of commutation voltage may be explained as follows. Suppose that valve T1 is conducting, and condenser C2 is charged to the value of the supply voltage. With valve T1 conducting, its cathode K1 and junction 30 will be clamped at substantially the value of the supply voltage. Transients in the load will not disturb this voltage clamp, and since capacitor C2 is charged to substantially the same value of the voltage clamp on junction 30, the capacitor cannot discharge via junction 30. The only other possible path for discharge at this time is through reactor L2, junction 32 and asymmetric circuit 38. But here the diode D6 blocks the discharge from capacitor C2. Thus the commutation voltage in capacitor C2 is preserved for commutation despite transients or other changes occurring in the load.

The orientation of the decoupling diodes D5 and D6 is such that during commutation the two together would short circuit the commutation reactor L. This short circuit is prevented by providing the asymmetric circuits 36 and 38 with sufficient impedance. This is the main purpose of reactors L3 and L4. These reactors prevent the decoupling network 34 from short circuiting the commutation circuit during commutation.

Diodes D1 and D2 clamp capacitors C1 and C2 to the positive and negative input buses, respectively, to prevent overcharge of the capacitors, and to suppress overshoot surges from the commutating capacitor after commutation. Diodes D3 and D4 handle regenerative power of reactive loads.

In FIG. 3, there is shown a modification of a single phase bridge DC to AC inverter embodying the invention. This modified bridge 53 employs only one of the previously described current control units U, which is indicated at U1. The unit U1 in FIG. 3 is identical to unit U1 in FIG. 2. The main difference between FIGS. 2 and 3 is that in FIG. 2, the return paths for valves T1 and T2 are through valves T4 and T3 respectively, while in FIG. 3, the load current return paths for valves T1 and T2 are through capacitors C4 and C3. Thus in FIG. 3, the bridge branch including valve T1 and asymmetric circuit 36 is opposite a bridge branch constituted by capacitor C4, while the bridge branch including T2 and asymmetric circuit 38 is opposite a bridge branch constituted by capacitor C3. In FIG. 3, the load terminals LD1 and LD2 are connected to the primary of a transformer 54 whose secondary is connected to an AC load.

Firing signals are alternately applied to valves T1 and T2 by a firing circuit 56, whose outputs are connected as indicated to the gate and cathode electrodes of the valves T1 and T2. A chart showing the firing order is also shown in FIG. 3.

The decoupling network 34 in the bridge 53 (FIG. 3), while equivalent to the decoupling network 34 in the bridge 10 (FIG. 2), is shown with reactors L3 and L4 coupled on a common core. This is merely to illustrate an equivalent variant. In any unit U of any figure herein, reactors L3 and L4 may be on a common core or they may be on separate cores. The location of the diodes D5 and D6 may be as in FIGS. 2 and 3, or they may be connected as in FIGS. 4 and 5. These are all substantially equivalent variations.

The operation of the commutation scheme and decoupling network of unit U1 in FIG. 3 is the same as that of unit U1 in FIG. 2.

The bridge 10 of FIG. 2 may be modified into a three phase bridge DC to AC inverter by merely adding a third current control unit U across the DC input terminals and providing a gating circuit to suit. Such a modification is shown in FIG. 4 wherein a three phase bridge inverter is indicated at 58 and an exemplary firing circuit therefore is shown at 60. In bridge 58, current control units U1, U2 and U3 are alike and, except for an equivalent variation in the decoupling network 34, are identical to the units U1 and U2 of FIG. 2. The commutation scheme and the decoupling network 34 in each unit U of the bridge 58 operates in the same manner as those in each unit U of FIG. 2.

Units U1, and U2 and U3 being identical, only unit U1 is shown in detail, and only the valves T are shown for units U2 and U3. The valves T in unit U2 are labeled T3 and T4, while the valves T in unit U3 are indicated at T5 and T6. The output terminals LD of the units U1, U2 and U3 are labeled LD1, LD2 and LD3, and are shown connected to a three phase AC load 94.

It should be noted that in FIGS. 2, 3, 4 and 5, corresponding parts bear corresponding reference characters.

Gating signals are supplied by the gating circuit 60 to the respective valves T in FIG. 58 in accordance with the firing order chart shown in the lower part of FIG. 4.

The firing circuit 60 is shown as having a pulse generator or sequencer 62 for sequentially applying uniformly spaced trigger pulses P1, P2 and P3 to the trigger inputs T of respective flip-flops 64, 66 and 68.

Each flip-flop has a single input or trigger line T, and changes state in response to each succeeding pulse applied to its trigger input T. Each flip-flop is provided with a pair of output lines 1 and 0 and a common line labeled B+. Such a configuration may for example be provided by a flip-flop having a pair of cross-coupled NPN transistors. The outputs 1 and 0 of flip-flop 64 are connected to the ends of a center-tapped primary of a transformer 70 that has a pair of output windings 72 and 74. The center tap of the primary is connected to the common B+. In one state of the flip-flop an output is provided on its output line 1, and in the other state of the flip-flop an output is provided on its output line 0. Thus succeeding pulses to the trigger input T of the flip-flop alternately excite the primary of transformer 70 in opposite polarities.

In similar manner flip-flop 66 has associated therewith a transformer 76 with secondary windings 78 and 80. Similarly the outputs of flip-flop 68 are connected to a transformer 82 having secondary windings 84 and 86.

Each of the transformer secondary windings of the gating circuit 60 is connected through a series resistance diode network to the input circuit of a different one of the valves T as specifically indicated by the corresponding reference characters at the transformer output lines and electrodes of the valves T. For example transformer secondary 72 is connected to the gate-cathode circuit of valve T1; secondary winding 78 is connected to the gate-cathode circuit of valve T6; and so on. The particular firing circuit 60 shown in FIG. 4 is by way of example only and any suitable firing circuit may be employed.

Pulse sequencer 62 is provided with output lines 88, 90 and 92 along which the sequences 62 applies input pulses successively to the respective trigger inputs T of flip-flops 64, 66 and 68. For example the pulse sequencer of 62 applies a pulse P1 along output line 88 to the trigger of flip-flop 64 at 0° of the pulse sequencer output cycle; a pulse P2 along line 90 to the trigger input of flip-flop 66 at 120° of the sequencer output cycle; a pulse P3 along line 92 to the input trigger of flip-flop 68 at 240° of the pulse sequencer cycle and repeating with pulse P1 along line 88 at 360° of the pulse sequencer output cycle. The output of sequencer 62 repetitively recycles. The pulse sequencer output cycle is not to be confused with the firing cycle of the output cycle of the bridge 58. It may be noted from the firing order chart in FIG. 4 that it requires 2 cycles of the pulse sequencer to produce the firing pulses for one cycle of the bridge 58.

FIG. 5 illustrates the present invention as embodied in a type of current converter known as a DC chopper 96 controlled by a gating circuit 98. As in FIGS. 2 to 4, the chopper 96 of FIG. 5 includes a current control unit U1 equivalent to the units U shown in the other figures. Chopper 96 differs from the other current converters shown in that the load terminal LD2 is returned substantially directly to the DC input circuit through a line 100, while in the other figures the return path is either through capacitors (C3 and C4, FIG. 3) or through valves T in other units U (FIGS. 2 and 4). For example in FIG. 5, in the circuit involving valve T1, the return path to the DC input is directly through line 100. On the other hand the return path for the current path involving valve T1 in FIGS. 2 and 4 is back to the DC input through a valve T in one or more other units U as the case may be. In FIG. 3 the current path through the valve T1 is returned to the DC input circuit through capacitor C4.

The commutation scheme and the decoupling network 34 in the unit U1 of chopper 96 function in the same manner as those in any of the units U in FIGS. 2, 3 and 4.

The power current in chopper 96 is handled by valve T1 and the power current path includes DC terminal 14, valve T1, junction 30, asymmetric circuit 36, output terminal LD1, a load 102, output terminal LD2, line 100, and through DC input terminal 16 back to the DC source 18. In FIG. 5, valve T1 not only carries the power current but as in the other figures commutates (turns-off) valve T2 when it (valve T1) is turned-on. However, the sole purpose of valve T2 in chopper 96 is to turn-off valve T1 at a desired predetermined time to control the conduction period of valve T1. Valve T1 is turned-off in response to valve T2 being turned-on.

Let $I_1$ be the interval between the respective firing angles of valves T1 and T2 in that order, and $I_2$ be the interval between the respective firing angles of valves T2 and T1 in that order. The firing circuit 98, by way of example is of a type wherein the ratio between intervals $I_1$ and $I_2$, and thereby the conduction intervals of valve T1 are adjustable. Thus valve T1 will fire at 0° and 360° while valve T2 will fire at an adjustable angle therebetween to provide a desired ratio between the $I_1$ and $I_2$. This may be effected by making oscillator 104 a variable ratio oscillator such as a multivibrator having two cross-coupled switching elements (tubes, transistors, or other) whose respective on-times may be controlled so as to adjust the ratio therebetween. The outputs of the respective switching elements are fed in opposite directions to different valves of the center-tapped primary of a transformer 106 that is provided with secondary windings 108 and 110. Secondary winding 108 is connected through a resistor diode network to the control circuit of valve T1 as indicated by corresponding reference characters applied to the output leads of that secondary winding and the cathode and gate electrodes of the valve T1. Secondary winding 110 is connected through a resistor diode network to the control circuit of valve T2 as indicated by corresponding legends on electrodes of valve T2 and the output leads of that secondary winding. The respective sides of the multivibrator sequentially excite transformer 106 in opposite directions, with the ratio of times for the opposite directions being adjustable. When transformer 106 is excited in one direction a firing signal is supplied to valve T1, and when excited in the opposite direction a firing signal is supplied to valve T2.

Diodes D3 and D4 while desirable for reactive loads, may be omitted when load 102 is a resistive load. To omit these diodes requires that the lines they are in be open-circuited.

From the description herein it is seen that each of the current converting circuits of FIG. 2 to FIG. 5 includes at least one current control unit U connected across DC input lines, the unit U having an output terminal LD connectable to a load, and also having a return path from the load to the DC input circuit.

It should be understood that various well known circuit additions such as trapped energy release circuits, valve protection circuits, etc., are employed in current converting circuits of the general character disclosed herein. Such adjuncts may be employed where desired in the herein-disclosed circuits. However, they are not shown herein since they are not required to illustrate the invention.

The present invention provides an improved current converter wherein good commutation is assured, loss of commutation energy is prevented, and a commutating reactor of optimal design is allowed by virtue of a decoupling network which decouples the load from the commutation circuit. The result is a fuller utilization of the power capabilities of the apparatus, and a current converter that can be pulse width modulated and still have good transient response.

It is to be understood that the herein described arrangements are simply illustrative of the principles of the invention, and that other embodiments and applications are within the spirit and scope of the invention.

We claim as our invention:
1. In a current converter: a DC input circuit having first and second DC input terminals; first and second output terminals; first and second controlled electric valves, each having respective inlet, outlet and control electrodes, and an internal main current path extending between said inlet and outlet electrodes, said valves being of the type which block in both directions until a firing signal is applied to the control electrode while the valve is forwardly biased at which time the valve is rendered conductive in the forward direction until a reverse bias is applied across the valve; a first circuit connected across said DC terminals and including in series in the order named said first valve, first commutating winding means, a junction, second commutating winding means, and said second valve, said first and second winding means being inductively coupled, said valves being poled in the same direc- tion relative to said DC terminals; a second circuit connected across said DC terminals and including in series in the order named a first commutation capacitor, said junction and a second commutation capacitor; load circuit means connecting at least one of said valves to said first output terminal for passing load current between that valve and said first output terminal, said load circuit means having asymmetric means for decoupling the load circuit means from both winding means; return current path means coupling said second output terminal to said DC input circuit, said return current path means being operable when a load is connected to said output terminals to provide a return path cooperating with said at least one valve during at least a portion of the conductive period of that valve to transmit power to said load; and means for supplying control signals to said valves in a desired order.

2. In a current converter: a DC input circuit having first and second DC input terminals; first and second output terminals for connection to a load; first and second controlled electric valves, each having respective inlet, outlet and control electrodes, and an internal main current path extending between said inlet and outlet electrodes, said valves being of the type which block in both directions until a firing signal is applied to the control electrode while the valve is forwardly biased at which time the valve is rendered conductive in the forward direction until a reverse bias is applied across the valve; a first circuit connected across said DC terminals and including in series in the order named said first valve, a first junction, first winding means, a second junction, second winding means, a third junction and said second valve, said first and second winding means being inductively coupled, said valves being poled in the same direction relative to said DC terminals; a second circuit connected across said DC terminals and including in series in the order named a first commutation capacitor, said second junction and a second commutation capacitor; a first asymmetric circuit connected across said first junction and said first output terminal, and poled in the same direction as said first valve relative to said first output terminal; a second asymmetric circuit connected across said third junction and said first output terminal; said first and second asymmetric circuits being poled in the same direction as said valves relative to said DC terminals; said first and second asymmetric circuits forming a shunt circuit across said first and second winding means, said shunt circuit having sufficient impedance therein to prevent short circuiting of commutation energy developed across said first and second winding means; return current path means coupling said second output terminal to said DC input circuit, said return current path means being operable when a load is connected to said output terminals to provide a return path cooperating with at least one of said valves during at least a portion of the conductive period of said at least one valve to transmit power to said load; and means for supplying control signals to the control electrodes of said valves in a predetermined order.

3. A DC-AC inverter comprising: first and second DC input terminals; first and second AC output terminals for connection to a load; first and second controlled electric valves, each having respective inlet, outlet and control electrodes, and an internal main current path extending between said inlet and outlet electrodes, said valves being of the type which block in both directions until a firing signal is applied to the control electrode while the valve is forwardly biased at which time the valve is rendered conductive in the forward direction until a reverse bias is applied across the valve; a first circuit connected across said DC terminals and including in series in the order named said first valve, a first junction, first commutation winding means, a second junction, second commutation winding means, a third junction and said second valve, said first and second winding means being inductively coupled, said valves being poled in the same direction relative to said DC terminals; a second circuit connected across said DC terminals and including in series in the order named a first commutation capacitor, said second junction and a second commutation capacitor; a first asymmetric circuit connected across said first junction and said first AC terminal, and poled in the same direction as said first valve relative to said first AC terminal; a second asymmetric circuit connected across said third junction and said first AC terminal, and poled in the same direction as said second valve relative to said first AC terminal; said first and second asymmetric circuits forming a shunt circuit across said first and second winding means, said shunt circuit having sufficient impedance therein to prevent short circuiting of commutation energy developed across said first and second winding means during commutation; a third circuit connected across said DC terminals and including in series in the order named a first current return path, said second AC terminal and a second return current path, said first return path being operable when a load is connected to said AC terminals to provide a return path cooperating with said second valve during at least a portion of the conductive period of the second valve to transmit power to said load, said second return path being operable when a load is connected to said AC terminals to provide a return path cooperating with said first valve during at least a portion of the conductive period of the first valve to transmit power to the load; and means for supplying control signals to said control electrodes in a predetermined order.

4. A DC-AC inverter comprising, first and second DC input terminals, a plurality of current control units connected across said DC terminals, each of said units comprising: an output terminal; a first circuit connected across said DC terminals and including in series in the order named a first controlled electric valve, a first junction, first commutation inductive reactor means, a second junction, second commutation inductive reactor means, a third junction and a second controlled electric valve, said first and second reactor means being inductively coupled, said valves being poled in the same direction relative to said DC terminals; a second circuit connected across said DC terminals and including in series in the order named a first commutation capacitor, said second junction and a second commutation capacitor; a first asymmetric circuit connected across said first junction and said output terminal, and poled in the same direction as said first valve relative to said output terminal; a second asymmetric circuit connected across said third junction and said output terminal, and poled in the same direction as said second valve relative to said output terminal; said first and second asymmetric circuits forming a shunt circuit across said first and second reactor means, said shunt circuit having sufficient impedance therein to prevent short circuiting of commutation energy developed across said first and second reactor means during commutation; said output terminals of all said units being adapted to be connected to a common load, whereby said units are operative to cooperate with each other in converting DC received at said DC input terminals to AC at said output terminals; each of said valves having respective inlet, outlet and control electrodes, and an internal main current path extending between said inlet and outlet electrodes, said valves being of the type which block in both directions until a firing signal is applied to the control electrode while the valve is forwardly biased at which time the valve is rendered conductive in the forward direction until a reverse bias is applied across the valve; and means for supplying control signals to the control electrodes of said valves in a predetermined order.

5. The combination as in claim 4 wherein there are two of said current control units, and said predetermined order is such that the control units cooperate to produce single phase AC at their output terminals.

6. The combination as in claim 4 wherein there are three of said current control units, and said predetermined order is such that the control units cooperate to produce three phase AC at their output terminals.

References Cited

UNITED STATES PATENTS

| | | | |
|---|---|---|---|
| 3,278,827 | 10/1966 | Corey et al. | 321—44 |
| 3,303,406 | 2/1967 | Bedford | 321—45 X |
| 3,308,371 | 3/1967 | Studtmann | 321—45 |
| 3,311,809 | 3/1967 | Corey et al. | 321—45 |

OTHER REFERENCES

A Silicon-Controlled Rectifier Inverter With Improved Commutation, by McMurray and Shattuck, Paper 61–718 presented at AIEE Summer General Meeting, Ithaca, N.Y., June 18–23, 1961, pub. May. 2, 1961 by AIEE.

JOHN F. COUCH, *Primary Examiner.*

G. GOLDBERG, *Assistant Examiner.*